United States Patent
Tyler (10) Patent No.: US 10,632,673 B2
(45) Date of Patent: Apr. 28, 2020

(54) ADDITIVE MANUFACTURING SYSTEM HAVING SHUTTER MECHANISM

(71) Applicant: CC3D LLC, Coeur d'Alene, ID (US)

(72) Inventor: Kenneth Lyle Tyler, Coeur d'Alene, ID (US)

(73) Assignee: Continuous Composites Inc., Coeur d'Alene, ID (US)

( * ) Notice: Subject to any disclaimer, the term of this patent is extended or adjusted under 35 U.S.C. 154(b) by 342 days.

(21) Appl. No.: 15/611,430

(22) Filed: Jun. 1, 2017

(65) Prior Publication Data

US 2018/0065320 A1 Mar. 8, 2018

Related U.S. Application Data

(60) Provisional application No. 62/383,801, filed on Sep. 6, 2016.

(51) Int. Cl.
*B29C 64/209* (2017.01)
*B29C 64/264* (2017.01)
*B29C 64/106* (2017.01)
*B33Y 10/00* (2015.01)
*B33Y 30/00* (2015.01)
(Continued)

(52) U.S. Cl.
CPC ........ *B29C 64/209* (2017.08); *B29C 35/0805* (2013.01); *B29C 64/106* (2017.08); *B29C 64/264* (2017.08); *B33Y 10/00* (2014.12); *B33Y 30/00* (2014.12); *B33Y 50/02* (2014.12); *B05D 1/26* (2013.01); *B29C 48/154* (2019.02); *B29C 48/2556* (2019.02); *B29C 48/266* (2019.02); *B29C 48/30* (2019.02); *B29C 48/301* (2019.02); *B29C 48/304* (2019.02); *B29C 64/188* (2017.08); *B29C 2035/0827* (2013.01);
(Continued)

(58) Field of Classification Search
None
See application file for complete search history.

(56) References Cited

U.S. PATENT DOCUMENTS 2,044,961 A * 6/1936 Waner ................ B29D 30/0633
264/167
2,578,229 A * 12/1951 Marcel ..................... B21C 3/06
72/468
(Continued)

FOREIGN PATENT DOCUMENTS

DE 4102257 A1 7/1992
EP 2589481 B1 1/2010
(Continued)

OTHER PUBLICATIONS

International Search Report, dated Dec. 4, 2017 for PCT/US2017/045552, to CC3D LLC, filed on Aug. 4, 2017.
(Continued)

*Primary Examiner* — Seyed Masoud Malekzadeh
*Assistant Examiner* — Manley L Cummins, IV
(74) *Attorney, Agent, or Firm* — Ryan C. Stockett (57) ABSTRACT

A system is disclosed for use in additively manufacturing a composite structure. The system may include a head configured to discharge a composite material including a matrix and continuous reinforcement. The system may also include a shutter mechanism mounted to the head and configured to grasp the continuous reinforcement after discharge from the head.

16 Claims, 3 Drawing Sheets

(51) Int. Cl.
  *B33Y 50/02* (2015.01)
  *B29C 35/08* (2006.01)
  *B29C 48/30* (2019.01)
  *B29C 48/154* (2019.01)
  *B29C 48/255* (2019.01)
  *B29C 48/25* (2019.01)
  *B29C 64/188* (2017.01)
  *B29K 105/00* (2006.01)
  *B29K 105/08* (2006.01)
  *B05D 1/26* (2006.01)
  *D03D 15/12* (2006.01)
  *B33Y 70/00* (2020.01)

(52) U.S. Cl.
  CPC .. *B29K 2105/0058* (2013.01); *B29K 2105/08* (2013.01); *B33Y 70/00* (2014.12); *D03D 15/12* (2013.01)

(56) References Cited

U.S. PATENT DOCUMENTS

| | | | |
|---|---|---|---|
| 3,286,305 A | 11/1966 | Seckel | |
| 3,393,090 A * | 7/1968 | Barraco | H01J 9/04 427/77 |
| 3,480,999 A * | 12/1969 | Carlo | B29C 48/30 425/381 |
| 3,809,514 A | 5/1974 | Nunez | |
| 3,984,271 A | 10/1976 | Gilbu | |
| 3,993,726 A | 11/1976 | Moyer | |
| 4,643,940 A | 2/1987 | Shaw et al. | |
| 4,671,761 A | 6/1987 | Adrian et al. | |
| 4,734,024 A * | 3/1988 | Tashiro | A21C 11/103 425/132 |
| 4,822,548 A | 4/1989 | Hempel | |
| 4,851,065 A | 7/1989 | Curtz | |
| 5,002,712 A | 3/1991 | Goldmann et al. | |
| 5,037,691 A | 8/1991 | Medney et al. | |
| 5,121,329 A * | 6/1992 | Crump | B22F 3/115 700/119 |
| 5,134,569 A * | 7/1992 | Masters | B29C 35/08 700/182 |
| 5,139,710 A * | 8/1992 | Smith | B29B 15/122 264/103 |
| 5,204,124 A * | 4/1993 | Secretan | B29C 64/124 425/145 |
| 5,296,335 A | 3/1994 | Thomas et al. | |
| 5,340,433 A | 8/1994 | Crump | |
| 5,625,435 A | 4/1997 | Lo et al. | |
| 5,746,967 A | 5/1998 | Hoy et al. | |
| 5,866,058 A | 2/1999 | Batchelder et al. | |
| 5,936,861 A | 8/1999 | Jang et al. | |
| 6,153,034 A | 11/2000 | Lipsker | |
| 6,257,863 B1 * | 7/2001 | Otte | B29C 48/30 425/381 |
| 6,459,069 B1 | 10/2002 | Rabinovich | |
| 6,501,554 B1 | 12/2002 | Hackney et al. | |
| 6,803,003 B2 | 10/2004 | Rigali et al. | |
| 6,934,600 B2 | 8/2005 | Jang et al. | |
| 6,964,508 B2 * | 11/2005 | Yoneda | G01B 11/00 362/269 |
| 7,795,349 B2 | 9/2010 | Bredt et al. | |
| 8,221,669 B2 | 7/2012 | Batchelder et al. | |
| 8,962,717 B2 | 2/2015 | Roth et al. | |
| 9,126,365 B1 | 9/2015 | Mark et al. | |
| 9,126,367 B1 | 9/2015 | Mark et al. | |
| 9,149,988 B2 | 10/2015 | Mark et al. | |
| 9,156,205 B2 | 10/2015 | Mark et al. | |
| 9,186,846 B1 | 11/2015 | Mark et al. | |
| 9,186,848 B2 | 11/2015 | Mark et al. | |
| 9,327,452 B2 | 5/2016 | Mark et al. | |
| 9,327,453 B2 | 5/2016 | Mark et al. | |
| 9,370,896 B2 | 6/2016 | Mark | |
| 9,381,702 B2 | 7/2016 | Hollander | |
| 9,457,521 B2 | 10/2016 | Johnston et al. | |
| 9,458,955 B2 | 10/2016 | Hammer et al. | |
| 9,527,248 B2 | 12/2016 | Hollander | |
| 9,539,762 B2 | 1/2017 | Durand et al. | |
| 9,579,851 B2 | 2/2017 | Mark et al. | |
| 9,688,028 B2 | 6/2017 | Mark et al. | |
| 9,694,544 B2 | 7/2017 | Mark et al. | |
| 9,764,378 B2 | 9/2017 | Peters et al. | |
| 9,770,876 B2 | 9/2017 | Farmer et al. | |
| 9,782,926 B2 | 10/2017 | Witzel et al. | |
| 2002/0009935 A1 | 1/2002 | Hsiao et al. | |
| 2002/0062909 A1 | 5/2002 | Jang et al. | |
| 2002/0113331 A1 | 8/2002 | Zhang et al. | |
| 2002/0165304 A1 | 11/2002 | Mulligan et al. | |
| 2003/0044539 A1 | 3/2003 | Oswald | |
| 2003/0056870 A1 | 3/2003 | Comb et al. | |
| 2003/0160970 A1 | 8/2003 | Basu et al. | |
| 2003/0186042 A1 | 10/2003 | Dunlap et al. | |
| 2003/0236588 A1 | 12/2003 | Jang et al. | |
| 2005/0006803 A1 | 1/2005 | Owens | |
| 2005/0061422 A1 | 3/2005 | Martin | |
| 2005/0104257 A1 | 5/2005 | Gu et al. | |
| 2005/0109451 A1 | 5/2005 | Hauber et al. | |
| 2005/0230029 A1 | 10/2005 | Vaidyanathan et al. | |
| 2007/0003650 A1 | 1/2007 | Schroeder | |
| 2007/0228592 A1 | 10/2007 | Dunn et al. | |
| 2008/0176092 A1 | 7/2008 | Owens | |
| 2009/0095410 A1 | 4/2009 | Oldani | |
| 2011/0032301 A1 | 2/2011 | Fienup et al. | |
| 2011/0143108 A1 | 6/2011 | Fruth et al. | |
| 2012/0060468 A1 | 3/2012 | Dushku et al. | |
| 2012/0159785 A1 | 6/2012 | Pyles et al. | |
| 2012/0231225 A1 | 9/2012 | Mikulak et al. | |
| 2012/0247655 A1 | 10/2012 | Erb et al. | |
| 2013/0115324 A1* | 5/2013 | Hegler | B29C 48/908 425/133.1 |
| 2013/0164498 A1 | 6/2013 | Langone et al. | |
| 2013/0209600 A1 | 8/2013 | Tow | |
| 2013/0233471 A1 | 9/2013 | Kappesser et al. | |
| 2013/0292039 A1 | 11/2013 | Peters et al. | |
| 2013/0337256 A1 | 12/2013 | Farmer et al. | |
| 2013/0337265 A1 | 12/2013 | Farmer | |
| 2014/0034214 A1 | 2/2014 | Boyer et al. | |
| 2014/0039451 A1 | 2/2014 | Bangera et al. | |
| 2014/0061974 A1 | 3/2014 | Tyler | |
| 2014/0159284 A1 | 6/2014 | Leavitt | |
| 2014/0232035 A1 | 8/2014 | Bheda | |
| 2014/0268604 A1 | 9/2014 | Wicker et al. | |
| 2014/0287124 A1 | 9/2014 | Goto et al. | |
| 2014/0291886 A1 | 10/2014 | Mark et al. | |
| 2014/0328963 A1* | 11/2014 | Mark | B33Y 50/02 425/143 |
| 2015/0136455 A1 | 5/2015 | Fleming | |
| 2015/0217517 A1 | 8/2015 | Karpas et al. | |
| 2016/0012935 A1 | 1/2016 | Rothfuss | |
| 2016/0031155 A1 | 2/2016 | Tyler | |
| 2016/0046082 A1 | 2/2016 | Fuerstenberg | |
| 2016/0052208 A1 | 2/2016 | Debora et al. | |
| 2016/0082641 A1 | 3/2016 | Bogucki et al. | |
| 2016/0082659 A1 | 3/2016 | Hickman et al. | |
| 2016/0107379 A1 | 4/2016 | Mark et al. | |
| 2016/0114532 A1 | 4/2016 | Schirtzinger et al. | |
| 2016/0136885 A1 | 5/2016 | Nielsen-Cole et al. | |
| 2016/0144565 A1 | 5/2016 | Mark et al. | |
| 2016/0144566 A1 | 5/2016 | Mark et al. | |
| 2016/0192741 A1 | 7/2016 | Mark | |
| 2016/0200047 A1 | 7/2016 | Mark et al. | |
| 2016/0243762 A1 | 8/2016 | Fleming et al. | |
| 2016/0263806 A1 | 9/2016 | Gardiner | |
| 2016/0263822 A1 | 9/2016 | Boyd | |
| 2016/0263823 A1 | 9/2016 | Espiau et al. | |
| 2016/0271876 A1 | 9/2016 | Lower | |
| 2016/0297104 A1 | 10/2016 | Guillemette et al. | |
| 2016/0311165 A1 | 10/2016 | Mark et al. | |
| 2016/0325491 A1 | 11/2016 | Sweeney et al. | |
| 2016/0332369 A1 | 11/2016 | Shah et al. | |
| 2016/0339633 A1 | 11/2016 | Stolyarov et al. | |
| 2016/0346998 A1 | 12/2016 | Mark et al. | |
| 2016/0361869 A1 | 12/2016 | Mark et al. | |

(56) References Cited

U.S. PATENT DOCUMENTS

| | | |
|---|---|---|
| 2016/0368213 A1 | 12/2016 | Mark |
| 2016/0368255 A1 | 12/2016 | Witte et al. |
| 2017/0007359 A1 | 1/2017 | Kopelman et al. |
| 2017/0007360 A1 | 1/2017 | Kopelman et al. |
| 2017/0007361 A1 | 1/2017 | Boronkay et al. |
| 2017/0007362 A1 | 1/2017 | Chen et al. |
| 2017/0007363 A1 | 1/2017 | Boronkay |
| 2017/0007365 A1 | 1/2017 | Kopelman et al. |
| 2017/0007366 A1 | 1/2017 | Kopelman et al. |
| 2017/0007367 A1 | 1/2017 | Li et al. |
| 2017/0007368 A1 | 1/2017 | Boronkay |
| 2017/0007386 A1 | 1/2017 | Mason et al. |
| 2017/0008333 A1 | 1/2017 | Mason et al. |
| 2017/0015059 A1 | 1/2017 | Lewicki |
| 2017/0015060 A1 | 1/2017 | Lewicki et al. |
| 2017/0021565 A1 | 1/2017 | Deaville |
| 2017/0028434 A1 | 2/2017 | Evans et al. |
| 2017/0028588 A1 | 2/2017 | Evans et al. |
| 2017/0028617 A1 | 2/2017 | Evans et al. |
| 2017/0028619 A1 | 2/2017 | Evans et al. |
| 2017/0028620 A1 | 2/2017 | Evans et al. |
| 2017/0028621 A1 | 2/2017 | Evans et al. |
| 2017/0028624 A1 | 2/2017 | Evans et al. |
| 2017/0028625 A1 | 2/2017 | Evans et al. |
| 2017/0028627 A1 | 2/2017 | Evans et al. |
| 2017/0028628 A1 | 2/2017 | Evans et al. |
| 2017/0028633 A1 | 2/2017 | Evans et al. |
| 2017/0028634 A1 | 2/2017 | Evans et al. |
| 2017/0028635 A1 | 2/2017 | Evans et al. |
| 2017/0028636 A1 | 2/2017 | Evans et al. |
| 2017/0028637 A1 | 2/2017 | Evans et al. |
| 2017/0028638 A1 | 2/2017 | Evans et al. |
| 2017/0028639 A1 | 2/2017 | Evans et al. |
| 2017/0028640 A1* | 2/2017 | Harrison ............... B29C 69/001 |
| 2017/0028644 A1 | 2/2017 | Evans et al. |
| 2017/0030207 A1 | 2/2017 | Kittleson |
| 2017/0036403 A1 | 2/2017 | Ruff et al. |
| 2017/0050340 A1 | 2/2017 | Hollander |
| 2017/0057164 A1 | 3/2017 | Hemphill et al. |
| 2017/0057165 A1 | 3/2017 | Waldrop et al. |
| 2017/0057167 A1 | 3/2017 | Tooren et al. |
| 2017/0057181 A1 | 3/2017 | Waldrop et al. |
| 2017/0064840 A1 | 3/2017 | Espalin et al. |
| 2017/0066187 A1 | 3/2017 | Mark et al. |
| 2017/0087768 A1 | 3/2017 | Bheda |
| 2017/0106565 A1 | 4/2017 | Braley et al. |
| 2017/0120519 A1 | 5/2017 | Mark |
| 2017/0129170 A1 | 5/2017 | Kim et al. |
| 2017/0129171 A1 | 5/2017 | Gardner et al. |
| 2017/0129176 A1 | 5/2017 | Waatti et al. |
| 2017/0129182 A1 | 5/2017 | Sauti et al. |
| 2017/0129186 A1 | 5/2017 | Sauti et al. |
| 2017/0144375 A1 | 5/2017 | Waldrop et al. |
| 2017/0151728 A1 | 6/2017 | Kunc et al. |
| 2017/0157828 A1 | 6/2017 | Mandel et al. |
| 2017/0157831 A1 | 6/2017 | Mandel et al. |
| 2017/0157844 A1 | 6/2017 | Mandel et al. |
| 2017/0157851 A1 | 6/2017 | Nardiello et al. |
| 2017/0165908 A1 | 6/2017 | Pattinson et al. |
| 2017/0173868 A1 | 6/2017 | Mark |
| 2017/0182712 A1 | 6/2017 | Scribner et al. |
| 2017/0210074 A1 | 7/2017 | Ueda et al. |
| 2017/0217088 A1 | 8/2017 | Boyd et al. |
| 2017/0232674 A1 | 8/2017 | Mark |
| 2017/0259502 A1 | 9/2017 | Chapiro et al. |
| 2017/0259507 A1* | 9/2017 | Hocker ............... B33Y 10/00 |
| 2017/0266876 A1 | 9/2017 | Hocker |
| 2017/0266887 A1* | 9/2017 | Roviaro ............... B33Y 10/00 |
| 2017/0274585 A1 | 9/2017 | Armijo et al. |
| 2017/0284876 A1 | 10/2017 | Moorlag et al. |
| 2018/0015668 A1* | 1/2018 | Koskas ............... B29C 64/106 |
| 2018/0071986 A1* | 3/2018 | Buller ............... C22C 1/04 |
| 2018/0093413 A1* | 4/2018 | Yuasa ............... B29C 67/00 |
| 2018/0250876 A1* | 9/2018 | Michel ............... B33Y 10/00 |
| 2018/0282542 A1* | 10/2018 | Chaplin ............... C08G 65/4012 |
| 2018/0326659 A1* | 11/2018 | Gleyal-Martinez .... B33Y 30/00 |
| 2018/0370129 A1* | 12/2018 | Natale ............... B29C 70/382 |
| 2018/0370130 A1* | 12/2018 | Duffner ............... B29C 64/209 |
| 2019/0022936 A1* | 1/2019 | Mansson ............... B33Y 30/00 |

FOREIGN PATENT DOCUMENTS

| | | |
|---|---|---|
| EP | 3219474 A1 | 9/2017 |
| EP | 3409452 A1 * | 12/2018 |
| EP | 3409453 A1 * | 12/2018 |
| GB | 1149423 * | 10/1965 |
| KR | 100995983 B1 | 11/2010 |
| KR | 101172859 B1 | 8/2012 |
| WO | 2013017284 A2 | 2/2013 |
| WO | 2016088042 A1 | 6/2016 |
| WO | 2016088048 A1 | 6/2016 |
| WO | 2016110444 A1 | 7/2016 |
| WO | WO 2016125138 * | 8/2016 |
| WO | 2016159259 A1 | 10/2016 |
| WO | 2016196385 A1 | 12/2016 |
| WO | 2017006178 A1 | 1/2017 |
| WO | 2017006324 A1 | 1/2017 |
| WO | 2017051202 A1 | 3/2017 |
| WO | 2017081253 A1 | 5/2017 |
| WO | 2017085649 A1 | 5/2017 |
| WO | 2017087663 A1 | 5/2017 |
| WO | 2017018758 A1 | 6/2017 |
| WO | 2017122941 A1 | 7/2017 |
| WO | 2017122942 A1 | 7/2017 |
| WO | 2017122943 A1 | 7/2017 |
| WO | 2017123726 A1 | 7/2017 |
| WO | 2017124085 A1 | 7/2017 |
| WO | 2017126476 A1 | 7/2017 |
| WO | 2017126477 A1 | 7/2017 |
| WO | 2017137851 A2 | 8/2017 |
| WO | 2017142867 A1 | 8/2017 |
| WO | 2017150186 A1 | 9/2017 |

OTHER PUBLICATIONS

A. Di. Pietro & Paul Compston, Resin Hardness and Interlaminar Shear Strength of a Glass-Fibre/Vinylester Composite Cured with High Intensity Ultraviolet (UV) Light, Journal of Materials Science, vol. 44, pp. 4188-4190 (Apr. 2009).

A. Endruweit, M. S. Johnson, & A. C. Long, Curing of Composite Components by Ultraviolet Radiation: A Review, Polymer Composites, pp. 119-128 (Apr. 2006).

C. Fragassa, & G. Minak, Standard Characterization for Mechanical Properties of Photopolymer Resins for Rapid Prototyping, 1st Symposium on Multidisciplinary Studies of Design in Mechanical Engineering, Bertinoro, Italy (Jun. 25-28, 2008).

Hyouk Ryeol Choi and Se-gon Roh, In-pipe Robot with Active Steering Capability for Moving Inside of Pipelines, Bioinspiration and Robotics: Walking and Climbing Robots, Sep. 2007, p. 544, I-Tech, Vienna, Austria.

International Search Report dated Oct. 13, 2016 for PCT/US2016/042906 to CC3D LLC Filed Jul. 19, 2016.

Kenneth C. Kennedy II & Robert P. Kusy, UV-Cured Pultrusion Processing of Glass-Reinforced Polymer Composites, Journal of Vinyl and Additive Technology, vol. 1, Issue 3, pp. 182-186 (Sep. 1995), cited by applicant.

M. Martin-Gallego et al., Epoxy-Graphene UV-Cured Nanocomposites, Polymer, vol. 52, Issue 21, pp. 4664-4669 (Sep. 2011).

P. Compston, J. Schiemer, & A. Cvetanovska, Mechanical Properties and Styrene Emission Levels of a UV-Cured Glass-Fibre/Vinylester Composite, Composite Structures, vol. 86, pp. 22-26 (Mar. 2008).

S Kumar & J.-P. Kruth, Composites by Rapid Prototyping Technology, Materials and Design, (Feb. 2009).

S. L. Fan, F. Y. C. Boey, & M. J. M. Abadie, UV Curing of a Liquid Based Bismaleimide-Containing Polymer System, eXPRESS Polymer Letters, vol. 1, No. 6, pp. 397-405 (2007).

T. M. Llewelly-Jones, Bruce W. Drinkwater, and Richard S. Trask; 3D Printed Components With Ultrasonically Arranged Microscale Structure, Smart Materials and Structures, 2016, pp. 1-6, vol. 25, IOP Publishing Ltd., UK.

(56) References Cited

OTHER PUBLICATIONS

Vincent J. Lopata et al., Electron-Beam-Curable Epoxy Resins for the Manufacture of High-Performance Composites, Radiation Physics and Chemistry, vol. 56, pp. 405-415 (1999).

Yugang Duan et al., Effects of Compaction and UV Exposure on Performance of Acrylate/Glass-Fiber Composites Cured Layer by Layer, Journal of Applied Polymer Science, vol. 123, Issue 6, pp. 3799-805 (May 15, 2012).

* cited by examiner

ADDITIVE MANUFACTURING SYSTEM HAVING SHUTTER MECHANISM

RELATED APPLICATIONS

This application is based on and claims the benefit of priority from U.S. Provisional Application No. 62/383,801 that was filed on Sep. 6, 2016, the contents of all of which are expressly incorporated herein by reference.

TECHNICAL FIELD

The present disclosure relates generally to a manufacturing system and, more particularly, to an additive manufacturing system having a shutter mechanism.

BACKGROUND

Extrusion manufacturing is a known process for producing continuous structures. During extrusion manufacturing, a liquid matrix (e.g., a thermoset resin or a heated thermoplastic) is pushed through a die having a desired cross-sectional shape and size. The material, upon exiting the die, cures and hardens into a final form. In some applications, UV light and/or ultrasonic vibrations are used to speed the cure of the liquid matrix as it exits the die. The structures produced by the extrusion manufacturing process can have any continuous length, with a straight or curved profile, a consistent cross-sectional shape, and excellent surface finish. Although extrusion manufacturing can be an efficient way to continuously manufacture structures, the resulting structures may lack the strength required for some applications.

Pultrusion manufacturing is a known process for producing high-strength structures. During pultrusion manufacturing, individual fiber strands, braids of strands, and/or woven fabrics are coated with or otherwise impregnated with a liquid matrix (e.g., a thermoset resin or a heated thermoplastic) and pulled through a stationary die where the liquid matrix cures and hardens into a final form. As with extrusion manufacturing, UV light and/or ultrasonic vibrations are used in some pultrusion applications to speed the cure of the liquid matrix as it exits the die. The structures produced by the pultrusion manufacturing process have many of the same attributes of extruded structures, as well as increased strength due to the integrated fibers. Although pultrusion manufacturing can be an efficient way to continuously manufacture high-strength structures, the resulting structures may lack the form (shape, size, and/or precision) required for some applications. In addition, conventional pultrusion manufacturing may lack flexibility in cure rate of the liquid matrix, severing of the fibers, and/or placement of the matrix-coated fibers at a start of a pultrusion process.

The disclosed system is directed to addressing one or more of the problems set forth above and/or other problems of the prior art.

SUMMARY

In one aspect, the present disclosure is directed to an additive manufacturing system. The additive manufacturing system may include a head configured to discharge a composite material including a matrix and a continuous reinforcement. The system may also include a shutter mechanism mounted to the head and configured to grasp the continuous reinforcement after discharge from the head.

In another aspect, the present disclosure is directed to another additive manufacturing system. This additive manufacturing system may include a head configured to discharge a composite material including a matrix and a continuous reinforcement. The additive manufacturing system may also include at least one cure enhancer configured to enhance curing of the matrix, and a shutter mechanism mounted to the head and configured to selectively block energy generated by the cure enhancer from reaching the matrix.

In yet another aspect, the present disclosure is directed to a shutter mechanism for a head of an additive manufacturing system. The shutter mechanism may include a frame connectable to the head at a nozzle tip and configured to at least partially enclose a cure enhancer, and a plurality of leaves pinned to the frame and together forming a center opening. The shutter mechanism may also include an actuator configured to selectively rotate the frame and cause pivoting of the plurality of leaves, thereby changing a diameter of the center opening. The change of diameter may allow the plurality of leaves to at least one of restrict energy generated by the cure enhancer from reaching material discharged from the nozzle tip and passing through the center opening, and grasp the material.

DETAILED DESCRIPTION

Figure 1:
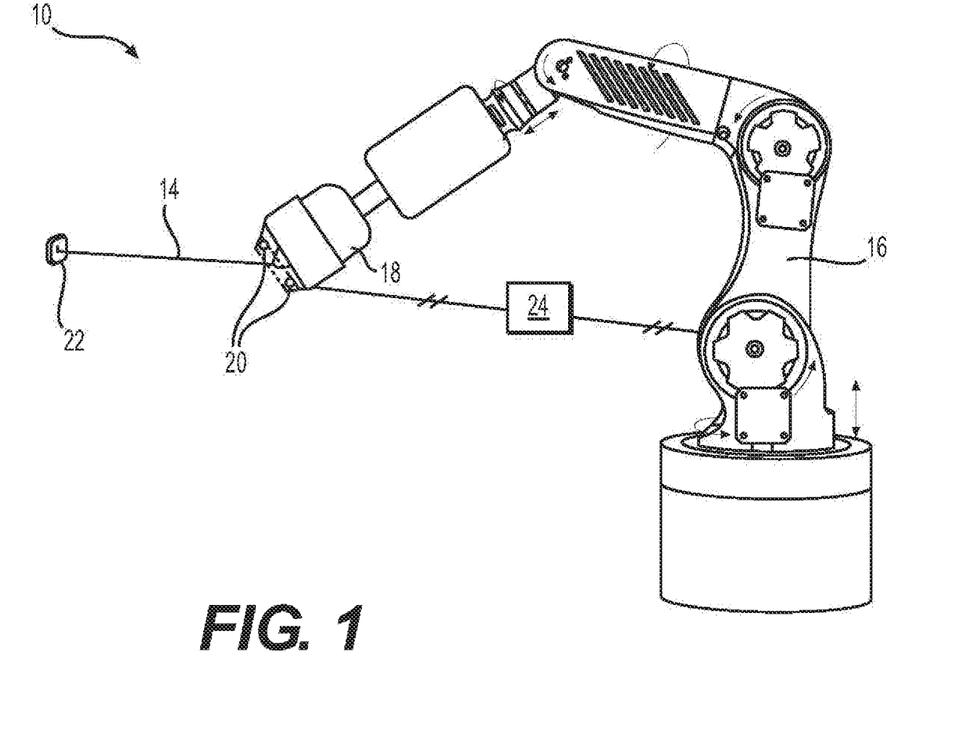
FIGS. 1 and 2 are diagrammatic illustrations of exemplary disclosed manufacturing systems.
Figure 2:
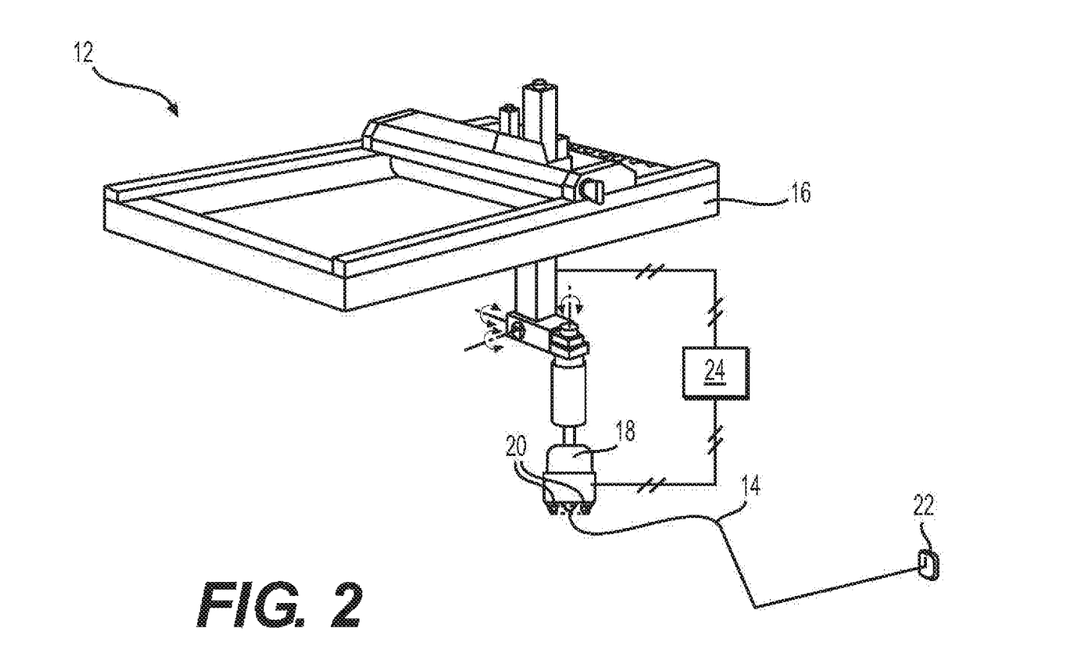

FIGS. 1 and 2 illustrate different exemplary systems 10 and 12, which may be used to continuously manufacture composite structures 14 having any desired cross-sectional shape (e.g., circular, polygonal, etc.). Each of systems 10, 12 may include at least a support 16 and a head 18. Head 18 may be coupled to and moved by support 16. In the disclosed embodiment of FIG. 1, support 16 is a robotic arm capable of moving head 18 in multiple directions during fabrication of structure 14, such that a resulting longitudinal axis of structure 14 is three-dimensional. In the embodiment of FIG. 2, support 16 is an overhead gantry also capable of moving head 18 in multiple directions during fabrication of structure 14. Although supports 16 of both embodiments are shown as being capable of 6-axis movements, it is contemplated that any other type of support 16 capable of moving head 18 in the same or in a different manner could also be utilized, if desired. In some embodiments, a drive may mechanically couple head 18 to support 16, and may include components that cooperate to move and/or supply power or materials to head 18.

Head 18 may be configured to receive or otherwise contain a matrix material. The matrix material may include any type of matrix material (e.g., a liquid resin, such as a zero volatile organic compound resin; a powdered metal; etc.) that is curable. Exemplary resins include thermosets, single- or multi-part epoxy resins, polyester resins, cationic epoxies, acrylated epoxies, urethanes, esters, thermoplastics, photopolymers, polyepoxides, thiols, alkenes, thiol-enes, and more. In one embodiment, the matrix material inside head 18 may be pressurized, for example by an external device (e.g., an extruder or another type of pump—not shown) that is fluidly connected to head 18 via a corresponding conduit (not shown). In another embodiment, however, the pressure may be generated completely inside of head 18 by a similar type of device. In yet other embodiments, the matrix material may be gravity-fed through and/or mixed within head 18. In some instances, the matrix material inside head 18 may need to be kept cool and/or dark to inhibit premature curing; while in other instances, the matrix material may need to be kept warm for the same reason. In either situation, head 18 may be specially configured (e.g., insulated, chilled, and/or warmed) to provide for these needs.

The matrix material may be used to coat, encase, or otherwise surround any number of continuous reinforcements (e.g., separate fibers, tows, rovings, and/or sheets of material) and, together with the reinforcements, make up at least a portion (e.g., a wall) of composite structure 14. The reinforcements may be stored within (e.g., on separate internal spools—not shown) or otherwise passed through head 18 (e.g., fed from external spools). When multiple reinforcements are simultaneously used, the reinforcements may be of the same type and have the same diameter and cross-sectional shape (e.g., circular, square, flat, etc.), or of a different type with different diameters and/or cross-sectional shapes. The reinforcements may include, for example, carbon fibers, vegetable fibers, wood fibers, mineral fibers, glass fibers, metallic wires, optical tubes, etc. It should be noted that the term "reinforcement" is meant to encompass both structural and non-structural types of continuous materials at least partially encased in the matrix material discharging from head 18.

The reinforcements may be exposed to (e.g., coated with) the matrix material while the reinforcements are inside head 18, while the reinforcements are being passed to head 18, and/or while the reinforcements are discharging from head 18, as desired. The matrix material, dry reinforcements, and/or reinforcements that are already exposed to the matrix material (e.g., wetted reinforcements) may be transported into head 18 in any manner apparent to one skilled in the art.

One or more cure enhancers (e.g., a UV light, an ultrasonic emitter, a laser, a heater, a catalyst dispenser, etc.) 20 may be mounted proximate (e.g., within or on) head 18 and configured to enhance a cure rate and/or quality of the matrix material as it is discharged from head 18. Cure enhancer 20 may be controlled to selectively expose surfaces of structure 14 to energy (e.g., UV light, electromagnetic radiation, vibrations, heat, a chemical catalyst, etc.) during the formation of structure 14. The energy may increase a rate of chemical reaction occurring within the matrix material, sinter the material, harden the material, or otherwise cause the material to cure as it discharges from head 18. In the depicted embodiments, cure enhancer 20 includes multiple LEDs (e.g., 6 different LEDs) that are equally distributed about a center axis of head 18. However, it is contemplated that any number of LEDs or other energy sources could alternatively be utilized for the disclosed purposes and/or arranged in another manner (e.g., unequally distributed, arranged in a row, etc.). For example, the primary and/or auxiliary cure enhancers 20 could be located on an arm (not shown) that trails behind head 18, if desired. The amount of energy produced by cure enhancer 20 may be sufficient to cure the matrix material before structure 14 axially grows more than a predetermined length away from head 18. In one embodiment, structure 14 is completely cured before the axial growth length becomes equal to an external diameter of the matrix-coated reinforcement.

The matrix material and reinforcement may be discharged from head 18 via at least two different modes of operation. In a first mode of operation, the matrix material and reinforcement are extruded (e.g., pushed under pressure and/or mechanical force) from head 18, as head 18 is moved by support 16 to create the 3-dimensional shape of structure 14. In a second mode of operation, at least the reinforcement is pulled from head 18, such that a tensile stress is created in the reinforcement during discharge. In this mode of operation, the matrix material may cling to the reinforcement and thereby also be pulled from head 18 along with the reinforcement, and/or the matrix material may be discharged from head 18 under pressure along with the pulled reinforcement. In the second mode of operation, where the matrix material is being pulled from head 18, the resulting tension in the reinforcement may increase a strength of structure 14, while also allowing for a greater length of unsupported material to have a straighter trajectory (i.e., the tension may act against the force of gravity to provide free-standing support for structure 14).

The reinforcement may be pulled from head 18 as a result of head 18 moving away from an anchor point 22. In particular, at the start of structure-formation, a length of matrix-impregnated reinforcement may be pulled and/or pushed from head 18, deposited onto an anchor point 22, and cured, such that the discharged material adheres to anchor point 22. Thereafter, head 18 may be moved away from anchor point 22, and the relative movement may cause the reinforcement to be pulled from head 18. It should be noted that the movement of reinforcement through head 18 could be assisted (e.g., via internal feed mechanisms), if desired. However, the discharge rate of reinforcement from head 18 may primarily be the result of relative movement between head 18 and anchor point 22, such that tension is created within the reinforcement. It is contemplated that anchor point 22 could be moved away from head 18 instead of or in addition to head 18 being moved away from anchor point 22.

Figure 3:
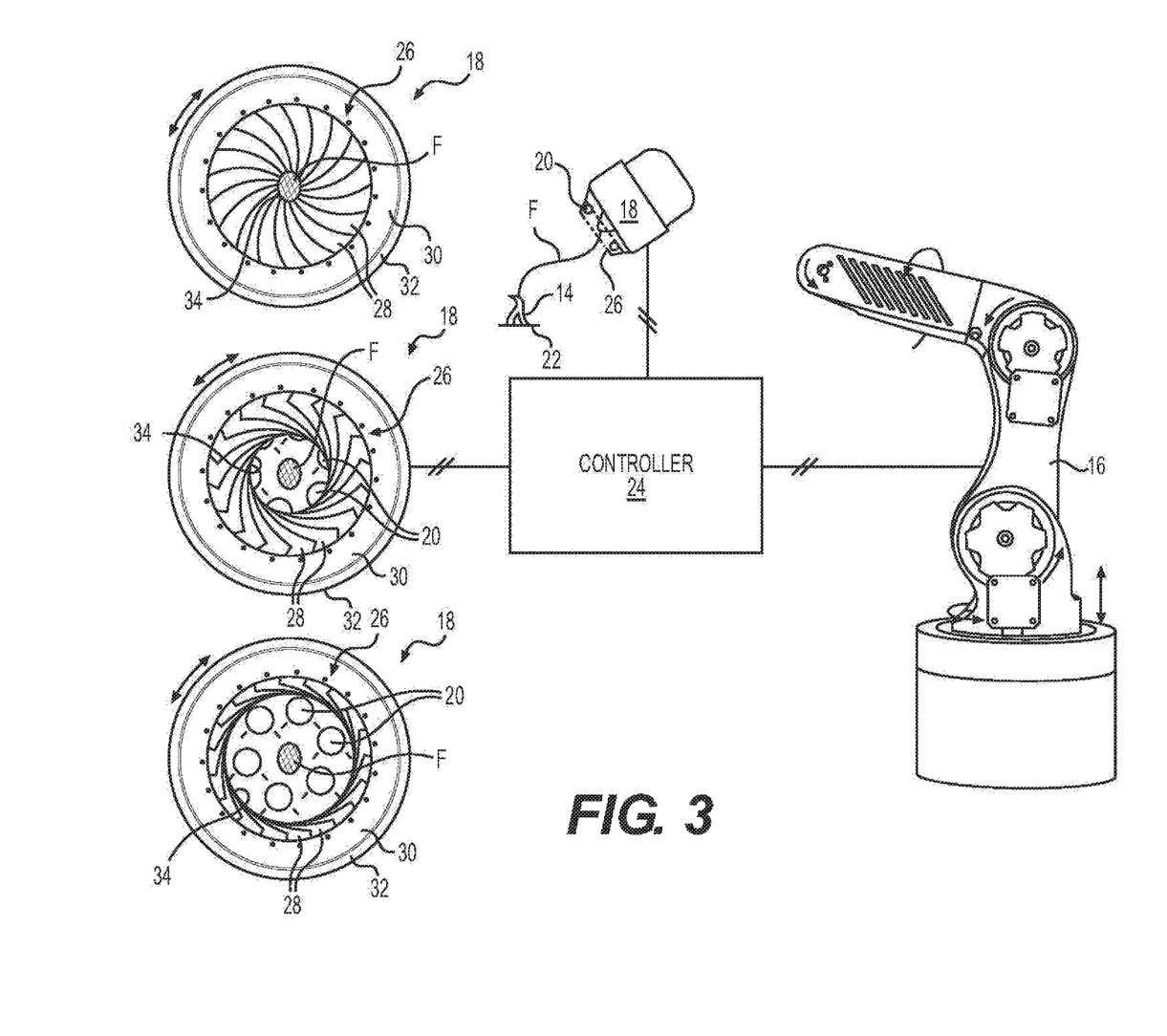
FIGS. 3 and 4 are diagrammatic illustrations of exemplary disclosed heads that may be used in conjunction with the manufacturing systems of FIGS. 1 and 2.

An exemplary control arrangement is shown in FIG. 3 that may be used to regulate operation of system 10 and/or 12 (referring to FIG. 1). As can be seen in this figure, a controller 24 is provided and shown as being communicatively coupled with support 16, head 18, and any number and type of cure enhancers 20. Controller 24 may embody a single processor or multiple processors that include a means for controlling an operation of system(s) 10 and/or 12. Controller 24 may include one or more general- or special-purpose processors or microprocessors. Controller 24 may further include or be associated with a memory for storing data such as, for example, design limits, performance characteristics, operational instructions, matrix characteristics, reinforcement characteristics, characteristics of structure 14, and corresponding parameters of each component of system(s) 10 and/or 12. Various other known circuits may be associated with controller 24, including power supply circuitry, signal-conditioning circuitry, solenoid/motor driver circuitry, communication circuitry, and other appropriate circuitry. Moreover, controller 24 may be capable of communicating with other components of system(s) 10 and/or 12 via wired and/or wireless transmission.

One or more maps may be stored in the memory of controller 24 and used during fabrication of structure 14. Each of these maps may include a collection of data in the form of lookup tables, graphs, and/or equations. In the disclosed embodiment, the maps are used by controller 24 to determine desired characteristics of cure enhancers 20, the associated matrix, and/or the associated reinforcements at different locations within structure 14. The characteristics may include, among others, a type, quantity, and/or configuration of reinforcement to be discharged at a particular location within structure 14. Controller 24 may then correlate operation of support 16 (e.g., the location and/or orientation of head 18) and/or the discharge of material from head 18 (a type of material, desired performance of the material, cross-linking requirements of the material, a discharge rate, etc.) with the operation of cure enhancers 20 such that structure 14 is produced in a desired manner Controller 24 may be further communicatively coupled with a shutter mechanism 26 located at or adjacent a nozzle tip of head 18. Shutter mechanism 26 may include, among other things, one or more pivotally connected metal leaves 28 that are disposed inside of an annular frame 30, and an actuator (e.g., a rotary actuator) 32 configured to open and close leaves 28 by rotating frame 30. In this embodiment, at least some of the available cure enhancers 20 may be located inside of frame 30, which may be operatively connected to head 18 (e.g., mounted to a housing of head 18 at the nozzle tip). With this configuration, leaves 28 may be selectively opened and closed (e.g., via rotation of frame 30 under the regulation of controller 24) to thereby variably expose and/or cover some or all of cure enhancer(s) 20.

In one embodiment, matrix-wetted reinforcements discharging from head 18 may pass through a center opening 34 of shutter mechanism 26 (e.g., when leaves 28 are in an open or partially closed position). In other embodiments, however, leaves 28 may be moved (e.g., pivoted about their pinned connections to frame 30) to decrease a diameter of center opening 34 and thereby selectively block the matrix and/or reinforcements from discharging from head 18 (e.g., when leaves 28 are pivoted to a completely closed position). Additionally, in some embodiments, leaves 28 may be used to grasp and place (e.g., during anchor-setting) the discharging material when pivoted to the partially closed position, and/or to selectively sever (e.g., cut, separate, or otherwise break off) the discharging material when pivoted to the completely closed position (e.g., with the diameter of center opening 34 is reduced to less than a diameter of the discharging material).

Controller 24 may be configured to reference the maps discussed above, and to selectively regulate actuator 32 to adjust the position of leaves 28 between the fully-open and fully-closed positions (e.g., in coordination with movement of support 16, movement of head 18, operation of cure enhancer 20, and/or movement of anchor point 22). By doing so, controller 24 may thereby adjust an amount of cure energy that reaches the discharging material, a grasping force applied to the discharging material, a cutting force applied to the discharging material, and/or passage (e.g., leakage) of material from head 18.

Figure 4:
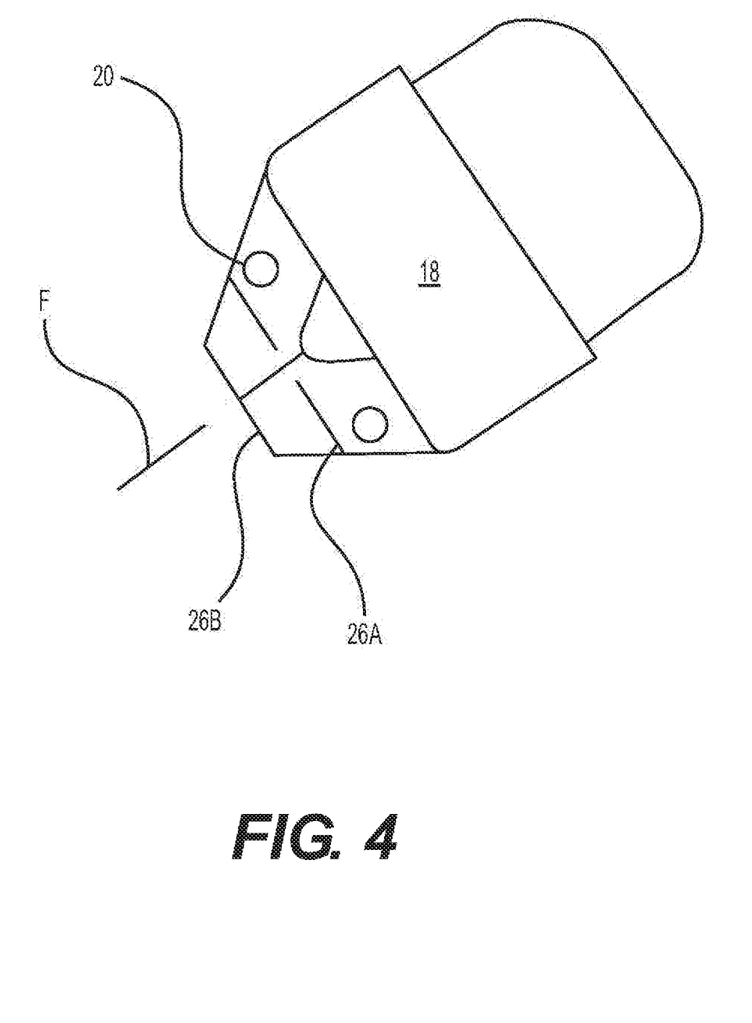

Another exemplary head 18 is illustrated in FIG. 4. Like head 18 of FIG. 3, head 18 of FIG. 4 may include one or more cure enhancers 20 located within shutter mechanism 26$_A$. In contrast to the embodiment of FIG. 3, however, shutter mechanism 26$_A$ of FIG. 4 may be configured to only grasp material discharging from the nozzle tip of head 18. In particular, shutter mechanism 26$_A$ may not be configured to sever the material. Instead, an additional shutter mechanism 26$_B$ may be nested together with shutter mechanism 26$_A$ (e.g., upstream or downstream of shutter mechanism 26$_A$, relative to a flow of the discharging material). Shutter mechanism 26$_B$ may be configured to only sever the material. It is contemplated that any one or both of shutter mechanism 26$_A$, 26$_B$ could additionally inhibit matrix leakage from head 18, if desired.

INDUSTRIAL APPLICABILITY

The disclosed systems may be used to continuously manufacture composite structures having any desired cross-sectional shape, length, density, and/or strength. The composite structures may include any number of different reinforcements of the same or different types, diameters, shapes, configurations, and consists. In addition, the disclosed systems may facilitate quick and simple start of a new printing process, inhibit undesired leakage of material, and clean termination of an ongoing printing process. Operation of systems 10 and 12 will now be described in detail.

At a start of a manufacturing event, information regarding a desired structure 14 may be loaded into systems 10 and 12 (e.g., into controller 24 that is responsible for regulating operations of support 16 and/or head 18). This information may include, among other things, a size (e.g., diameter, wall thickness, length, etc.), a contour (e.g., a trajectory), surface features (e.g., ridge size, location, thickness, length; flange size, location, thickness, length; etc.), connection geometry (e.g., locations and sizes of couplings, tees, splices, etc.), desired weave patterns, weave transition locations, location-specific matrix stipulations, location-specific reinforcement stipulations, etc. It should be noted that this information may alternatively or additionally be loaded into systems 10 and 12 at different times and/or continuously during the manufacturing event, if desired. Based on the component information, one or more different reinforcements and/or matrix materials may be selectively installed and/or continuously supplied into systems 10 and 12. In some embodiments, the reinforcements may also need to be connected to a pulling machine (not shown) and/or to a mounting fixture (e.g., to anchor point 22). Installation of the matrix material may include filling head 18 and/or coupling of an extruder (not shown) to head 18.

Connection of the reinforcements to anchor point 22 may be completed automatically, in some situations. For example, shutter mechanism 26 may be caused by controller 24 to grasp the associated matrix-wetted reinforcements protruding from head 18, and to hold onto the reinforcements during movement of head 18 toward anchor point 22. Grasping may be accomplished by actuator 32 being selectively energized by controller 24, resulting in frame 30 rotating in a desired direction. As frame 30 rotates, leaves 28, due to pinned connections with frame 30, may be caused to twist and slide to a partially closed position at which any reinforcements protruding from head 18 may be firmly held by leaves 28 at their inner periphery (i.e., at center opening 34). Head 18 may then be moved by support 16 under the regulation of controller 24 to cause the held reinforcements to be placed against or on a corresponding anchor point 22. Cure enhancers 20 may then be selectively activated to cause hardening of the matrix material surrounding the reinforcements, thereby bonding the reinforcements to anchor point 22. In some embodiments, leaves 28 may need to open some amount before the associated cure energy can reach the matrix bonding the reinforcements to anchor point 22. In other embodiments, external cure enhancers 20 may be activated to initiate this bonding.

The component information may then be used to control operation of systems 10 and 12. For example, the reinforcements may be pulled and/or pushed from head 18 (along with the matrix material), while support 16 selectively moves head 18 in a desired manner, such that an axis of the resulting structure 14 follows a desired trajectory (e.g., a free-space, unsupported, 3-D trajectory). It should be noted that shutter mechanism 26 may move to any position between the fully open and partially closed positions at this time, such that a proportional amount of energy from cure enhancer(s) 20 is absorbed by the discharging material (and also so that the discharging material may discharge freely).

Once structure 14 has grown to a desired length, structure 14 may be disconnected (e.g., severed) from head 18 in any desired manner Severing of structure 14 from head 18 (and vice versa) may also be accomplished by shutter mechanism 26 under the regulation of controller 24. For example, controller 24 may selectively energize actuator 32 to cause rotation of frame 30 until leaves 28 completely or almost completely close. At this point in time, leaves 28 will have pinched off any reinforcements protruding from head 18, leaving structure 14 untethered. In some situations, the closed nature of shutter mechanism 26 may inhibit unintentional leakage of material from head 18 during shutdown and/or subsequent movement.

It will be apparent to those skilled in the art that various modifications and variations can be made to the disclosed systems and head. Other embodiments will be apparent to those skilled in the art from consideration of the specification and practice of the disclosed systems and heads. It is intended that the specification and examples be considered as exemplary only, with a true scope being indicated by the following claims and their equivalents.

What is claimed is:

1. An additive manufacturing system, comprising:
   a head configured to discharge a composite material including a matrix and a continuous reinforcement;
   a first shutter mechanism mounted to the head, configured to receive the composite material, and moveable only from an open position at which the composite material is free to pass through the first shutter mechanism to a completely closed position at which the composite material is severed from the head; and
   a second shutter mechanism at least partially enclosed inside of the first shutter mechanism, and configured to move only between a fully open position at which the composite material is free to pass through the second shutter mechanism and a partially open position at which the second shutter mechanism grasps the continuous reinforcement after discharge from the head at a location upstream of where severing occurs.

2. The additive manufacturing system of claim 1, further including a controller having a memory with operational instructions stored therein for causing the second shutter mechanism to grasp and hold the continuous reinforcement during coordinated movement of the head against an anchor point as the matrix cures at a start of a manufacturing process.

3. The additive manufacturing system of claim 1, further including at least one cure enhancer, wherein the second shutter mechanism is configured to selectively block energy generated by the at least one cure enhancer from reaching the matrix.

4. The additive manufacturing system of claim 3, wherein the first shutter mechanism includes:
   an annular frame connected to the head at a nozzle tip; and
   a plurality of leaves configured to pivot open and closed during rotation of the annular frame.

5. The additive manufacturing system of claim 4, wherein the at least one cure enhancer is located inside of the annular frame.

6. The additive manufacturing system of claim 4, further including:
   an actuator configured to rotate the annular frame; and
   a controller configured to selectively energize the actuator.

7. The additive manufacturing system of claim 6, wherein the controller is configured to:
   receive information regarding a structure to be manufactured with the composite material; and
   coordinate operation of the first and second shutter mechanisms with movement of the head based on the information.

8. The additive manufacturing system of claim 1, wherein:
   the print head is configured to gravity feed matrix through the nozzle with the continuous reinforcement; and
   the second shutter mechanism is further configured to close around the continuous reinforcement without severing and inhibit matrix leakage from the head when the second shutter mechanism is in the closed position.

9. An additive manufacturing system, comprising:
   a head having a nozzle configured to discharge a composite material including a matrix and a continuous reinforcement;
   at least one light source located adjacent the nozzle and configured to enhance curing of the matrix; and
   a shutter mechanism mounted to the head and configured to completely enclose the nozzle and the at least one light source and selectively block energy generated by the at least one light source from reaching the matrix.

10. The additive manufacturing system of claim 9, wherein the shutter mechanism includes:
    an annular frame connected to the head at a nozzle; and
    a plurality of leaves configured to pivot open and closed during rotation of the annular frame.

11. The additive manufacturing system of claim 10, wherein the at least one light source is located inside of the annular frame.

12. The additive manufacturing system of claim 11, further including:
    an actuator configured to rotate the annular frame; and
    a controller configured to selectively energize the actuator.

13. The additive manufacturing system of claim 12, wherein the controller is configured to:
    receive information regarding a structure to be manufactured with the composite material; and
    coordinate operation of the shutter mechanism with movement of the head based on the information.

14. The additive manufacturing system of claim 9, wherein the shutter mechanism is configured to move from an open position at which energy from the at least one light source is unrestricted by the shutter mechanism, to a partially open position at which energy from the at least one light source is at least partially restricted.

15. The additive manufacturing system of claim 14, wherein the shutter mechanism is further configured to move to a closed position at which energy from the at least one light source is completely restricted by the shutter mechanism.

16. An additive manufacturing system, comprising:
    a head configured to discharge a composite material including a matrix and a continuous reinforcement;
    a support connected to the head and configured to move the head in multiple dimensions during discharging;
    a cure enhancer mounted on the head and configured to expose the matrix to cure energy at discharge;
    a shutter mechanism mounted to the head and configured to:
      selectively grasp and sever the continuous reinforcement; and
      selectively block energy generated by the at least one cure enhancer from reaching the matrix; and a controller having a memory with operational instructions stored therein for:
  receiving information regarding a structure to be manufactured with the composite material; and
  selectively coordinating operation of the shutter mechanism, the cure enhancer, and the support to grasp the composite material with the shutter mechanism during anchoring, to move the head away from an anchor with the support to initiate discharging, to cure the composite material with the cure enhancer during discharging, and to sever the composite material with the shutter mechanism after discharging, based on the information.

\* \* \* \* \*